United States Patent [19]

Murphy et al.

[11] Patent Number: 5,109,990

[45] Date of Patent: May 5, 1992

[54] KITCHENWARE DRYING RACK

[76] Inventors: John D. Murphy, 4417 Irving St., Boise, Id. 83706; Leo I. Kurtz, 1305 Richard Ave., Bethlehem, Pa. 18018

[21] Appl. No.: 664,943

[22] Filed: Mar. 5, 1991

[51] Int. Cl.⁵ .............................................. A47F 7/00
[52] U.S. Cl. ..................... 211/41; 312/229; D32/56
[58] Field of Search ............ 211/41; 312/229; D32/55, 56

[56] References Cited

U.S. PATENT DOCUMENTS

| | | | |
|---|---|---|---|
| 2,954,875 | 10/1960 | Becker | 211/41 |
| 4,221,299 | 9/1980 | Taylor | 211/41 |
| 4,756,582 | 7/1988 | Heien | 211/41 X |
| 4,843,975 | 7/1989 | Welsch et al. | 211/41 X |
| 4,854,537 | 8/1989 | Welch | D32/56 X |
| 5,012,934 | 5/1991 | Newhall | 211/41 |

Primary Examiner—Robert W. Gibson, Jr.
Attorney, Agent, or Firm—Joseph J. O'Keefe; Charles A. Wilkinson

[57] ABSTRACT

A kitchenware drying rack comprising a central frame, which has outwardly extending arms for holding kitchenware, mounted on a base adapted to rest on a flat surface adjacent a sink basin, and a platform that connects with the base lower end and extends downwardly into the sink basin to stabilize the rack and prevent its tipping.

12 Claims, 4 Drawing Sheets

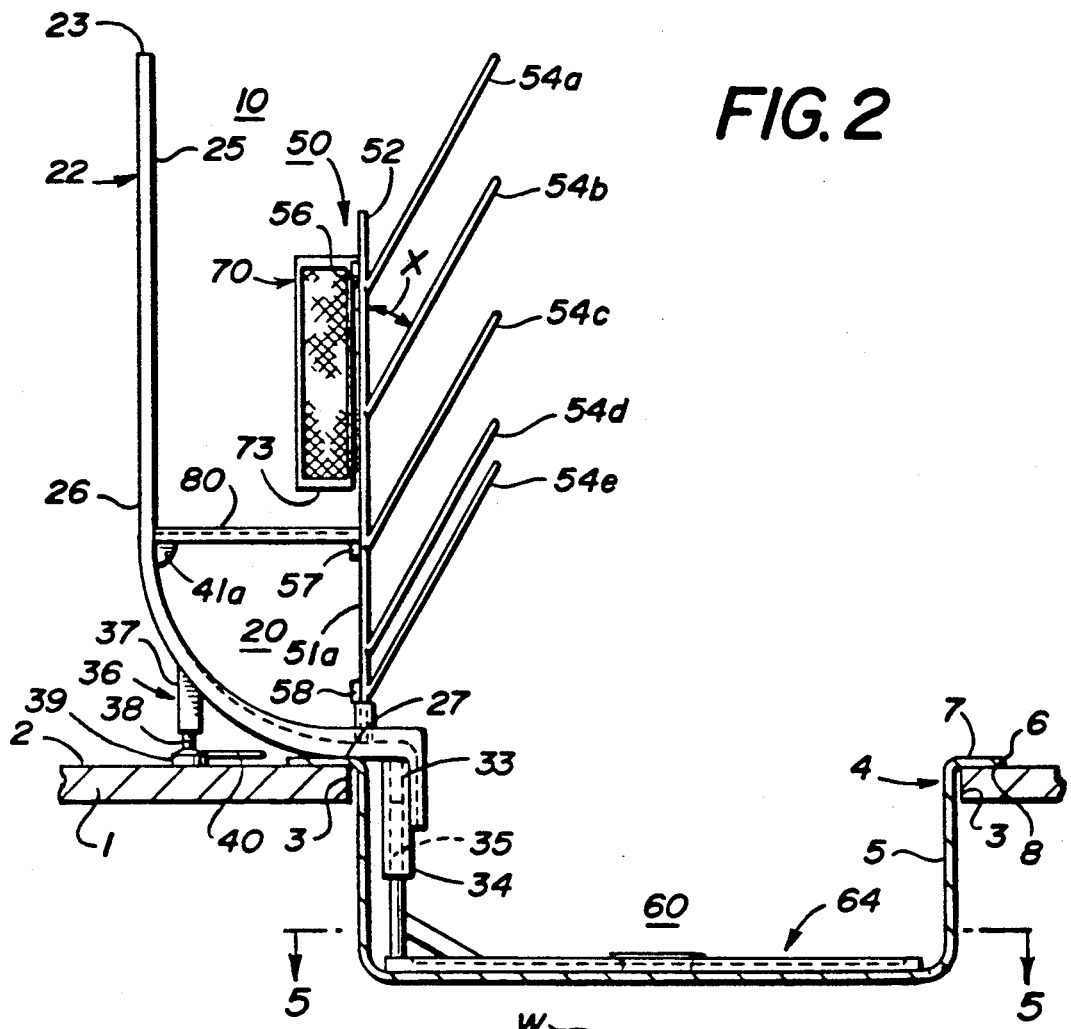
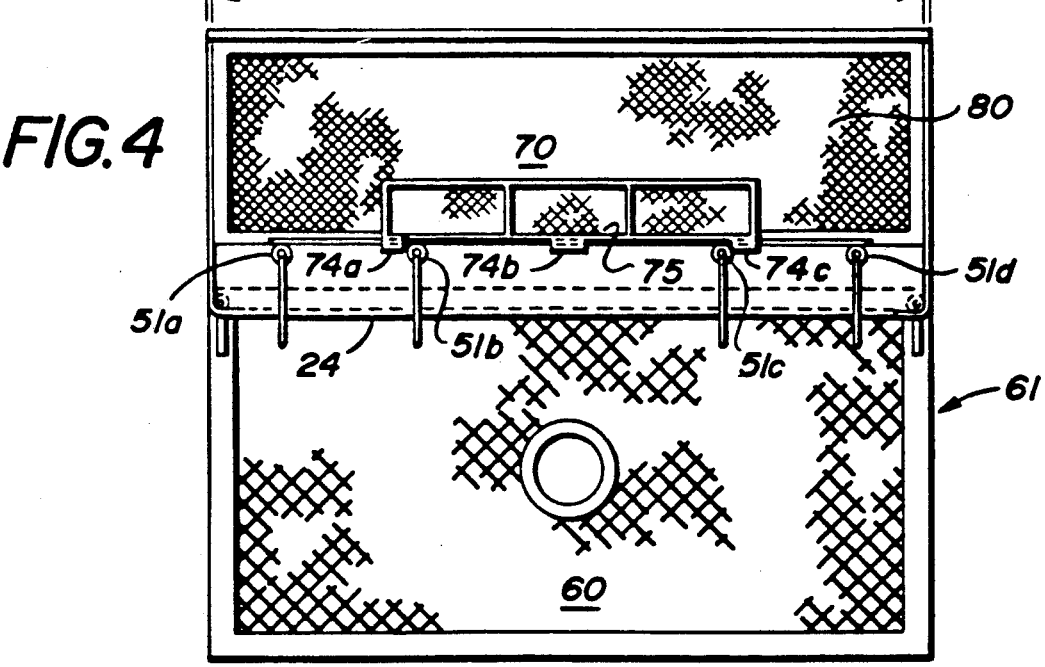

KITCHENWARE DRYING RACK

This invention relates to apparatus for holding kitchenware such as dishes, cups, glasses, cutlery, pans, etc. for drying purposes. More particularly, this invention relates to a compact and convenient rack, which is suitable for restricted areas, for holding kitchenware for drying purposes and the like.

BACKGROUND OF THE INVENTION

For many, many years racks of various designs have been available for holding kitchenware that has been washed and placed in such racks for drying purposes. Many of such designs have been patented.

U.S. Pat. No. 839,906 to J. B. Timberlake, U.S. Pat. No. 1,515,539 to A. Bank, U.S. Pat. No. 2,070,026 to H. J. Dick, Jr., and U.S. Pat. No. 2,958,424 to A. P. F. Bigatti are directed to folding drying racks, which are generally made of wire, that may be placed on a kitchen counter top to hold kitchenware placed in such racks for drying.

U.S. Pat. No. 2,936,898 to J Miguez, United Kingdom Pat. No. 395,054 to C. Montolieu et al., and United Kingdom Pat. No. 397,273 to E. H. Boss are directed to drying racks which are suitable for resting on a counter top and which include a base member or tray for collecting and/or channeling water draining from kitchenware placed in such racks.

German Patent No. 812,590 to H. Severin is directed to a drying rack that is clamped to the edge of a counter top, and U.S. Pat. No. 601,753 to M. Kaiser, U.S. Pat. No. 2,634,865 to W. 0. Geheb and United Kingdom Patent No, 351,209 to A. G. Melhuish et al. are directed to kitchen racks that are fastened to or suspended from a wall.

In the 1950's and 1960's trailers to be towed by automobiles were purchased by many persons for vacation travel. Subsequently, small pre-fabricated homes, referred to as mobile homes, became a popular form of housing for many people with limited incomes. During the past twenty years the earlier pull-away trailers have been superseded by recreational vehicles, popularly referred to as R-V's which are self-propelled vehicles that include living quarters. The trailers, mobile homes and recreational vehicles have one common feature; the living quarters, including kitchen, bath and sleeping areas, are much smaller than in a conventional home. In particular, the kitchen sinks are small, adjacent counter space is very limited and there is limited distance between the surfaces of the kitchen counters and the cabinets above them.

The invention described hereinafter overcomes certain deficiencies of the prior art drying racks by providing a compact kitchen drying rack particularly adapted to the limited space adjacent the sink in a kitchen of a trailer, mobile home or recreational vehicle, or in any kitchen having a minimum of counter space beside the sink.

An object of the invention is to provide a kitchenware drying rack which is of economical, compact construction and which occupies a minimum amount of counter space adjacent a sink.

Another object of the invention is to provide a kitchenware drying rack which includes a base that will direct water dripping from kitchenware placed in the rack into an adjacent sink.

It is a further object of this invention to provide a kitchenware drying rack which includes a stabilizing platform to prevent the rack from tipping.

SUMMARY OF THE INVENTION

In accordance with the present invention, the kitchenware drying rack comprises an inclined base for placement on a counter surface adjacent a sink basin, a frame member, which is mounted on the base, for holding kitchenware, and a stabilizing platform that connects with the base lower end and extends downwardly the sink basin.

The drying rack base, at its upper end has a vertical splash plate and at the underside of its lower end has a support portion for resting on a flat surface of a counter top or sink flange, adjacent a sink basin. On the bottom surface of the base, adjacent its sides and lower end, are downwardly extending columns, each having a vertically extending passageway. On the underside of the base and spaced from its lower end is an adjusting bracket for positioning the frame member with respect to the vertical. Spaced from the lower end of the base, on the top surface, are a plurality of spaced piers.

The drying rack frame comprises a plurality of spaced vertical support members each with its lower end adapted to be positioned in one of the piers on the top surface of the base. Extending upwardly and outwardly from each vertical support member, at an angle of about 30°, are a plurality of arms or prongs. A top cross member connects with each vertical support member adjacent its top, a bottom cross member connects with each vertical support member a distance from its bottom so as to be positioned above the tops of the base piers into which the vertical support members extend, and an intermediate cross member, spaced between the top and bottom cross members, which connects with each vertical support member.

The drying rack stabilizing platform comprises a screened frame member which is adapted to rest on the bottom of a sink basin and which has two vertical cylindrical posts extending upwardly from one edge of the screened frame member, one adjacent each edge thereof. The upper portion of each post extends upwardly for movement into and out of the passageway of one of the columns extending downwardly from the lower end of the base. The positioning of the posts of the stabilizing platform in the passageways of the columns extending downwardly from the lower end of the base offers two benefits. The interlocking effect of the platform posts positioned within the base columns stabilizes the rack and resists any tendency to tilt or fall if loaded in an unbalanced manner or accidentally bumped. The sliding positioning of the posts within the passageways of the base columns permits the stabilizing platform frame to be easily adjusted to rest on the bottom of a sink basin.

BRIEF DESCRIPTION OF THE DRAWINGS

The nature of the invention will be more clearly understood by reference to the following description, the appended claims and the several views illustrated in the accompanying drawings.

FIG. 2 is an end view of the drying rack of FIG. 1 as mounted on a counter top and extending into a sink basin, both in section.

FIG. 4 is a plan view of the drying rack of FIG. 1.

DESCRIPTION OF THE PREFERRED EMBODIMENTS

Figure 1:
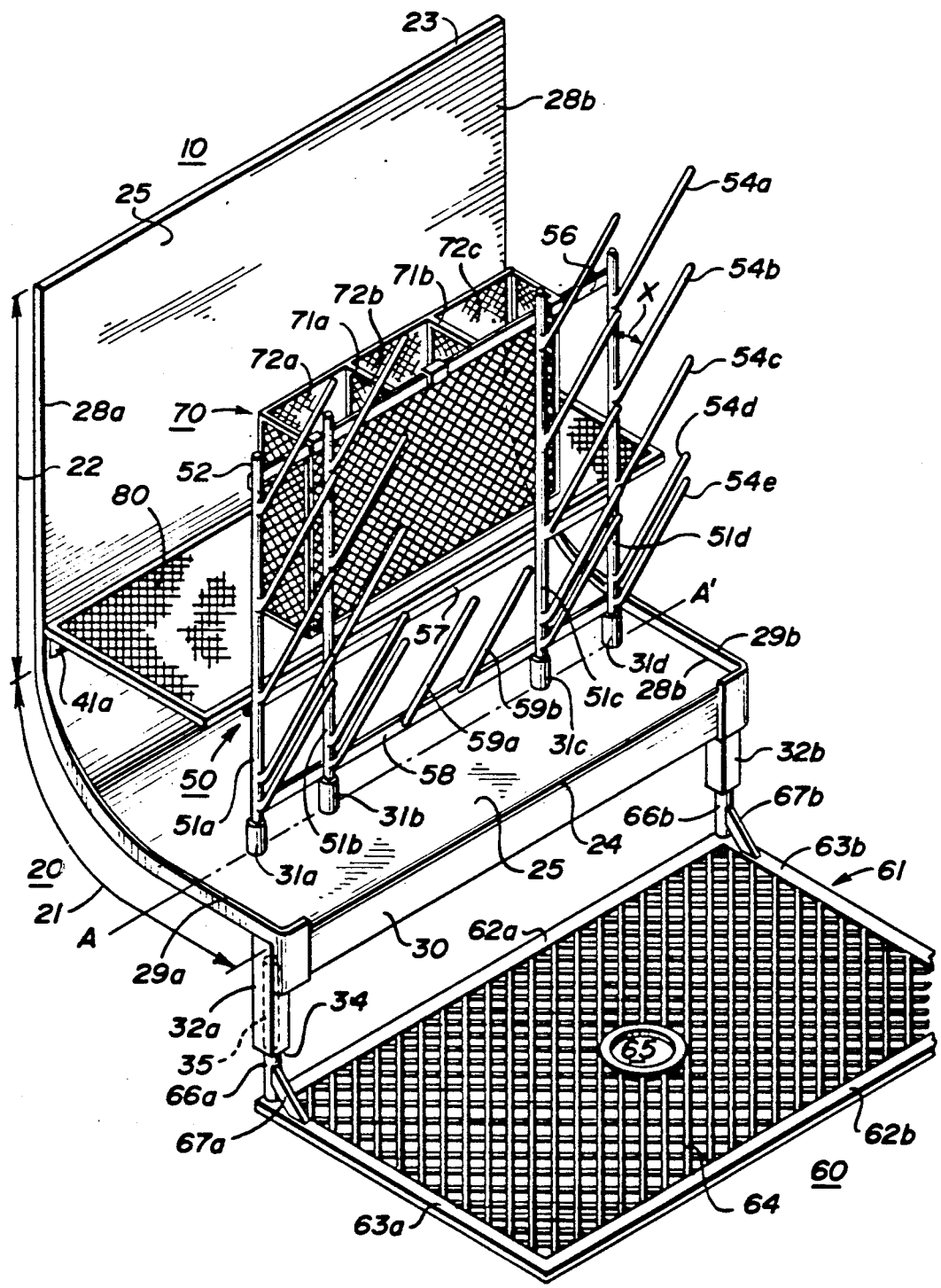
FIG. 1 is an isometric view of the kitchenware drying rack of this invention.

As best shown in FIG. 2, the kitchenware drying rack 10 of this invention is used in conjunction with a counter 1 having a top surface 2 and with a rectangular opening 3 in which is mounted sink 4. Sink 4 has basin 5 and mounting rim or flange 6 which extends outwardly in all directions from the upper end of basin 5 and overlaps a portion of counter top surface 4 adjacent opening 3. Flange 6 has a flat top surface 7 and bottom surface 8 which abuts counter top surface 2.

As best shown in FIGS. 1-5, drying rack 10 comprises base 20, central frame 50 and stabilizing platform 60. Base 20, which is made of molded plastic, has an inclined lower portion 21, a vertical upper portion or splash plate 22, an upper end 23, a lower end 24, an upper or inside surface 25 and a lower or outside surface 26. Mounting pad 27 extends adjacent lower end 24 of lower surface 26 of base 20.

Base 20 further includes edges 28a and 28b, shoulder strips 29a and 29b, respectively, and lower end or drip plate 30 which extends downwardly from base lower end 24. Piers 31a, 31b, 31c and 31d extend upwardly from base upper surface 25. Piers 31a, 31b, 31c, and 31d are located on a line A—A' extending transversely of base 20 and are each spaced an equal distance from base lower end 24. Pier 31a is spaced from base edge 28a, pier 31d is spaced from base edge 28b, pier 31b is spaced from pier 31a and pier 31c is spaced from pier 31d. The distance between pier 31b and 31c is greater than the distance between piers 31a and 31b and 31c and 31d, which is about equal. Extending downwardly from base lower surface 26, adjacent base lower end 24 and edges 28a and 28b, respectively, are square columns 32a and 32b, respectively. Columns 32a and 32b each have an upper end 33, a lower end 34 and a cylindrical cavity 35.

As best seen in FIG. 1 and 2, on the lower surface 26 of base lower portion 21 and spaced from lower end 24 is mounted adjusting bracket 36. Bracket 36 comprises tubular member 37 with a threaded interior hole, not shown, circular threaded rod 38, which moves within the threaded hole of tubular member 37, pad 39 at the lower end of rod 38 and adjusting arm 40 fastened to pad 39.

Drying rack central frame 50 comprises vertical support members 51a, 51b, 51c, and 51d, top cross member 56, intermediate cross member 57 and bottom cross member 58. Each of vertical support members 51a, 51b, 51c, and 51d, includes top portion 52, bottom portion 53, not visible, arms 54a, 54b, 54c, 54d, and 54e, which extend outwardly and upwardly at an angle X of about 30° to each support member. Top cross member 56 is fastened to each of vertical support members 51a, b, c, and d, above their top portions 52, bottom cross member 58 is fastened to each of vertical support members 51a, b, c, and d, above their bottom portions 53 and intermediate cross member 57 is fastened to each of vertical support members 51a, b, c, and d between top and bottom cross members 56 and 58, respectively. Arms 59a and 59b extend outwardly and upwardly at an angle X to the vertical, not shown, from bottom cross member 58.

Drying rack stabilizing platform 60 comprises frame 61 which is formed with sides 62a and 62b, ends 63a and 63b, and screen 64, which extends between sides 62a and 62b and between ends 63a and 63b and has central opening 65. Circular post 66a extends upwardly from adjacent the frame corner where frame side 62a meets end 63a and circular post 66b extends upwardly from adjacent the frame corner where frame side 62a meets end 63b. Brace 67a extends downwardly at an angle from post 66a to frame end 63a and brace 67b extends downwardly at an angle from post 66b to frame end 63b. The outside diameter of posts 66a and 66b are several thousandths of an inch smaller than the inside diameter of cylindrical cavity 35 of columns 32a and 32b so that the upper portion of posts 66a and 66b slide easily within cylindrical cavities 35 of drying rack base columns 32a and 32b, respectively.

Drying rack central frame 50 is fitted with perforated basket 70 which is separated by dividers 71a and 71b into three sections, 72a, 72b, and 72c. Basket 70 has an open top, not identified, and closed bottom 73 and is suspended by hangers 74a, 74b, and 74c which are fastened to the top inside edge 75 of basket 70 and loop over top cross member 56 of central frame 50. Drying rack mesh shelf 80 having a length L equal to the width W of drying rack base 20 extends between base vertical upper portion inside surface 25 and the back sides of rack section vertical support members 51a, 51b, 51c, and 51d, respectively, and rests on brackets 41a, b, and c mounted on inside surface 25 of base vertical upper portion 22 and on intermediate cross member 57 fastened to each of rack vertical support members 51a, b, c, and d, respectively.

The benefits of drying rack 10 of this invention are its size and simplicity, i.e. only three main pieces, base 20, frame 50 and stabilizing platform 60, with or without basket 70 and shelf 80. Rack 10 is assembled by placing stabilizing platform 60 in basin 5 of sink 4. Base 20 is positioned on counter top surface 2 with mounting pad 27 resting on sink flange upper surface 27 by sliding base columns 32a and 32b down over cylindrical posts 66a and 66b, respectively, of stabilizing platform 60 having screen 64 resting on the bottom of basin 5. Posts 66a and 66b extend closely within the cylindrical cavities 35 of base columns 32a and 32b, respectively, to whatever length is necessary to adjust for the depth of basin 5, but always maintaining between about 1 to 2 inches of the length of post 66a and 66b within cavities 35. Base mounting pad 27 is positioned on a flat surface adjacent sink basin 5, either on sink flange top surface 7 or top surface 2 of counter 1, depending upon the manner in which sink 4 is mounted in counter 1. Threaded rod 38 of base adjusting bracket 36 is rotated, as required, to place base 20 in a desired position, usually with splash guard 22 and frame 50 in a vertical position.

After rack base 20 and stabilizing platform 60 have been positioned, the bottom portions 53, not identified in the FIGS., of vertical support members 51a, b, c, and d of frame member 50 are placed in piers 31a, b, c, and d, respectively, of base 20, which locks frame member 50 into base 20. Mesh shelf 80 can be positioned on brackets 41a, b, and c, on base inside surface 25 and on the top of intermediate cross member 57 of frame member 50. Basket 70 can be positioned by hooking hangers 74a, b and c on basket inside edge 75 over top cross member 56 of frame member 50.

After rack 10 has been assembled, dishes, glasses, etc. may be washed in sink 5, rinsed and then placed in position on frame member 50 with their lower edges against vertical members 51a, b, c, and d and resting on arms 54a, b, c, d and e and 59a and 59b in a manner well known to those familiar with kitchen operations. Large pans may be rested on mesh shelf 80, leaning against inside surface 25 of splash guard 22 of base 20, and cutlery may be placed in sections 72a, b and c of basket 70. Arms 54d, 54e, 59a and 54b are positioned, as shown in FIGS. 1 and 2, in a manner most suitable for holding glasses. Water dripping from such kitchenware drops on the sloped inside surface 25 of base 20 and drains down such surface over base lower end 24 and drip plate 30 into sink 5. Rack stabilizing platform 60 acts as its name indicates, it lowers the center of gravity of rack 10 and reduces the possibility of its tipping when overloaded or when accidentally bumped.

The preferred embodiment of the invention may be built to a variety of dimensions. A particularly useful rack has a base which measures vertically about 16 inches from the base mounting pad 27 to upper end 23 and horizontally between about 7½ to 8½ inches and has a width from shoulder 29a to shoulder 21b of between about 14 to 18 inches. The spacing of vertical support members 51a, b, c, and d, cross members 56, 57 and 58 and arms 54a, b, c, and d and 59a and b may be varied as desired. Rack 10 may be manufactured of a variety of materials. It may be made entirely of plastic, or partially of plastic and with plastic coated wire, and/or metal, such as copper or stainless steel particularly for base columns 32a and 32b and stabilizing platform posts 66a and 66b.

Figure 3:
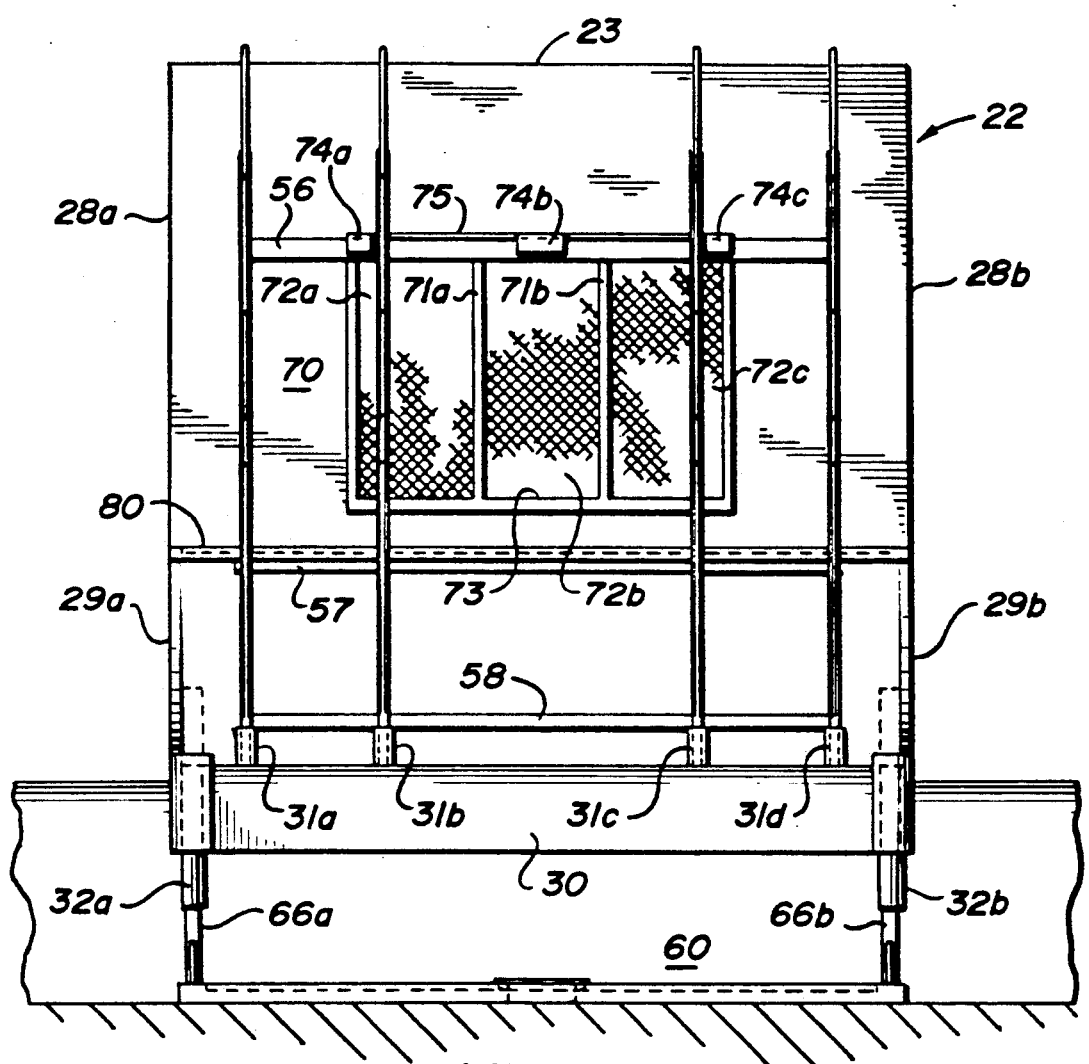
FIG. 3 is a front view of the drying rack of FIG. 1.
Figure 5:
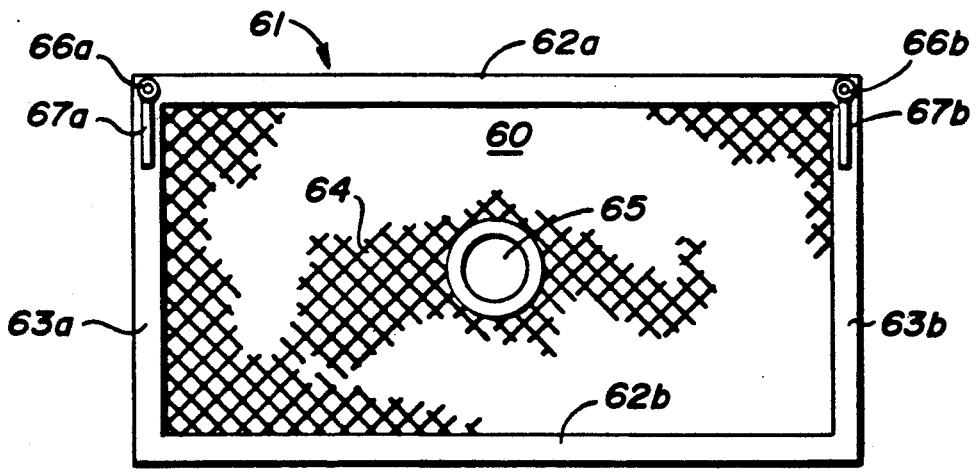
FIG. 5 is a section view taken through the line 5—5 of FIG. 2 looking in the direction of the arrows 5—5.
Figure 6:
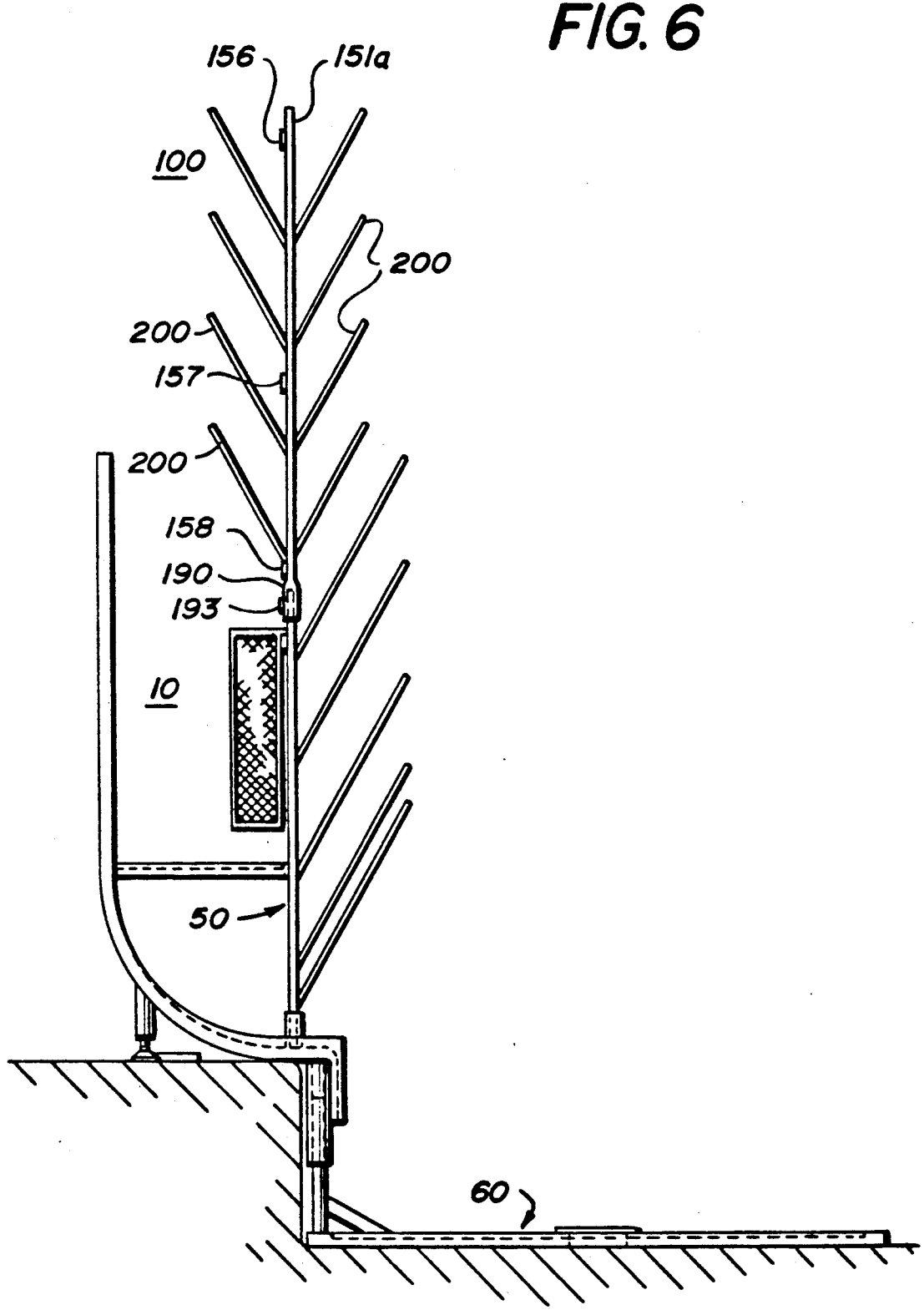
FIG. 6 is an end view of another embodiment of the kitchen drying rack of this invention.

An end view of another embodiment of the invention is shown in FIG. 6. This embodiment includes the preferred embodiment of rack 10 described above to which has been added frame extension 100. Frame extension 100 is built in a fashion similar to frame member 50 in that frame extension 100 has four vertical support members 151a, b, c and d, only member 151a is shown, which have the same diameter and are spaced apart the same distances as vertical support members 51a, b, c and d of frame member 50, as shown in FIGS. 1, 3 and 4. An enlarged portion or boss 190 is formed at the bottom of each vertical support member 151a, b, c and d of frame extension 100. Each boss 190 has a diameter larger than that of its vertical support member and has a passageway 191, not identified, extending upwardly from its lower end. A threaded hole 192, not identified, extends from the outer surface of each boss 190 through to its passageway 191. A set screw 193 is positioned in each threaded hole 192. Spaced arms 200 extend outwardly and upwardly at an angle of about 30° from both the front and back of each support member 151a, b, c, and d and act to support kitchenware in the same manner as do arms 54a, b, c, d and e of frame member 50. Top, intermediate and bottom cross members 156, 157 and 158 are fastened to vertical support members 151a, b, c, and d, in the same manner as cross members 56, 57, and 58 of frame 50, to provide stability to frame extension 100.

Frame extension 100, which is used when a large amount of kitchenware is being dried, is placed on frame member 50 by slipping boss 190 of each of vertical support members 151a, b, c, and d down over the top portion 52 of each of vertical support members 51a, b, c, and d of frame 50. Each such top portion 52 extends into passageway 191 of each boss 190 and is securely fastened in place by means of set screw 193. Frame extension 100 can be removed easily from rack frame 50 by loosening set screw 193 of each boss 190 and raising frame extension 100.

The number, size and spacing of the frame member vertical support members and the arms extending outwardly therefrom may be varied in any reasonable manner. In similar fashion, the cross section and length of stabilizing platform cylindrical posts 66a and b and base columns 32a and b into which they extend in a cooperative manner can also be varied in a reasonable manner and to accommodate the depth of various sized sinks.

Although several embodiments of the invention have been shown and described in full herein, there is no intention to limit the invention to the details of such embodiment. On the contrary, the intention is to cover all modifications as fall within the spirit and scope of the invention, specification and the appended claims.

We claim:
1. A rack for drying kitchenware for use on a countertop adjacent a sink basin comprising:
   (A) a frame having a plurality of arms for holding kitchenware;
   (B) a base supporting said frame and having a mounting portion of the underside thereof for resting adjacent said sink basin; and
   (C) platform means connecting with said base and extending downwardly therefrom into said sink basin for stabilizing said rack to prevent tilting thereof.
2. The rack of claim 1 wherein said arms extend only from one side of said frame.
3. The rack of claim 1 wherein adjusting bracket means extends downwardly from the underside of said base.
4. The rack of claim 1 wherein said frame includes a plurality of spaced vertical support members and at least two cross members, each connecting with at least two of said vertical support members.
5. The rack of claim 4 wherein said base has a downwardly extending inclined portion.
6. The rack of claim 1 wherein said base includes:
   (A) an upwardly extending splash plate portion;
   (B) an inclined intermediate portion;
   (C) a lower portion; and
   (D) adjusting bracket means extending downwardly from the underside of the base inclined portion.
7. The rack of claim 4 wherein a plurality of arms extend outwardly from at least four vertical support members.
8. The rack of claim 4 further including a frame extension comprising:
   (A) a plurality of vertical support members each having a boss at the lower end thereof for engaging the upper portion of a vertical support member of said frame and a plurality of spaced upwardly and outwardly extending arms; and
   (B) at least two cross members, each connecting with at least two of said vertical support members.
9. The rack of claim 5 wherein said base has an upwardly extending splash plate portion.
10. The rack of claim 6 wherein said base lower portion has two downwardly extending columns and said stabilizing platform has two upwardly extending posts connecting therewith.
11. A rack for drying kitchenware for use on a countertop adjacent a sink basin comprising:
   (A) a frame comprising:
      (a) at least four vertical members having:

(i) a plurality of spaced arms extending outwardly and upwardly therefrom;
(B) a base supporting same frame members and comprising:
  (a) an upwardly extending splash plate portion;
  (b) an intermediate portion;
  (c) a lower portion having:
    (i) a mounting portion on the underside thereof for positioning adjacent said sink basin; and
    (ii) two columns extending downwardly therefrom. each having a cavity therein; and
(C) platform means having:
  (a) two posts extending upwardly therefrom, each for connection with a column of said base lower portion; whereby said platform means placed on the bottom of said sink basin provides stability for said rack to prevent tilting thereof.

12. The rack of claim 11 wherein an adjusting bracket extends downwardly from said base intermediate portion to provide further support for said base.

* * * * *

UNITED STATES PATENT AND TRADEMARK OFFICE
CERTIFICATE OF CORRECTION

PATENT NO. : 5,109,990
DATED : May 5, 1992
INVENTOR(S) : John D. Murphy and Leo I. Kurtz It is certified that error appears in the above-indentified patent and that said Letters Patent is hereby corrected as shown below:

```
Col. 1, line 45, after "as R-V's" add a --comma (,)--.
Col. 2, line 11, after "downwardly" add --into--.
Col. 3, line 15, after "surface" delete "4" and substitute
     --2-- therefor.
Col. 3, line 38, after "which" delete "is" and substitute
     --are-- therefor.
Col. 3, line 60, delete "above" and substitute --below--
     therefor.
```

Signed and Sealed this

Thirteenth Day of July, 1993

Attest:

MICHAEL K. KIRK

*Attesting Officer*  Acting Commissioner of Patents and Trademarks